United States Patent
Butterfield

(10) Patent No.: US 6,461,862 B1
(45) Date of Patent: Oct. 8, 2002

(54) REMOVAL OF MALODOROUS GAS FROM GEOTHERMAL WATER

(75) Inventor: Floyd S. Butterfield, Paso Robles, CA (US)

(73) Assignee: Martin Resorts, Inc., San Luis Obispo, CA (US)

(*) Notice: Subject to any disclaimer, the term of this patent is extended or adjusted under 35 U.S.C. 154(b) by 23 days.

(21) Appl. No.: 09/697,682

(22) Filed: Oct. 26, 2000

(51) Int. Cl.[7] ............................................. C12M 1/00
(52) U.S. Cl. ........................... 435/289.1; 435/297.1; 210/86; 210/110; 210/188; 210/248
(58) Field of Search ................. 435/289.1, 297.1, 435/262, 266; 210/617, 621, 86, 110, 188, 194, 218, 257.1, 248; 95/263, 12, 24, 157, 165

(56) References Cited

U.S. PATENT DOCUMENTS

| | | | | |
|---|---|---|---|---|
| 4,992,181 A | * | 2/1991 | Siebet | 210/744 |
| 5,387,344 A | * | 2/1995 | McCombs et al. | 210/617 |
| 5,660,721 A | * | 8/1997 | Kyriss et al. | 210/86 |
| 5,661,027 A | * | 8/1997 | Takeuchi et al. | 435/266 |
| 6,087,159 A | * | 7/2000 | Finn | 435/299.1 |
| 6,251,167 B1 | * | 6/2001 | Berson | 95/263 |

OTHER PUBLICATIONS

Bowker, et al., "Odor and Corrosion Control in Sanitary Sewerage Systems and Treatment Plants", Noyes Data Corp., Park Ridge, N.J., 1989.

"Sulfide: Physical, Biological, and Chemical Characteristics", *Sulfide in Wastewater Collection and Treatment Systems*, ASCE–Manuals and Reports on Engineering Practice–#69, American Society of Civil Engineers, New York, New York, Chapter 2.

"Design of Odor Abatement Systems for New and Existing Facilities", *Sulfide in Wastewater Collection and Treatment Systems*, ASCE–Manuals and Reports on Engineering Practice–#69, American Society of Civil Engineers, New York, New York, Chapter 11.

* cited by examiner

Primary Examiner—David A. Redding
(74) Attorney, Agent, or Firm—Christie, Parker & Hale, LLP

(57) ABSTRACT

Malodorous gas is removed from mineral water by spraying the water through a stream of air, and collecting the sprayed water, which is circulated through the spraying operation. The collected sprayed water is passed through a filter. Some of the filtered and deodorized water is delivered to individual spas. A first heater keeps water circulated through the tank at a comfortable temperature. A second heater warms the air stream passing into the sprayed water to facilitate removal of malodorous gas.

7 Claims, 2 Drawing Sheets

REMOVAL OF MALODOROUS GAS FROM GEOTHERMAL WATER

This invention relates to removal of malodorous gas, such as hydrogen sulphide, from geothermal water, such as that produced from a geothermal well at the Paso Robles Inn in Paso Robles, Calif., to supply deodorized mineral water to spas located in various rooms at the Inn.

Warm mineral water from geothermal sources, such as wells and hot springs, has been used for centuries for therapeutic and recreational purposes. Mineral water often contains dissolved malodorous gases, such as hydrogen sulphide, which can be toxic, and even fatal at sufficiently high concentrations. In many public installations, the malodorous gases are simply permitted to diffuse into the atmosphere over a pool of the water available to the public. A facility of that type suffers from the disadvantages that noisome fumes are present, and public baths are less hygienic than private baths.

This invention provides apparatus and method for removing objectionable odor from geothermal water without adding anything to the water, and thus preserves the natural mineral qualities of the "hot springs" water. Thereafter the deodorized mineral water is supplied to individual baths or spas in private rooms at a hotel, or the like.

In brief, raw geothermal well water containing a malodorous gas is passed into a partially filled storage tank to form a body of water with space above it. Water from that body is sprayed into the space above the body of water, and air pumped into the head space below the spray passes through the spray and flows from the top of the tank, carrying with it the malodorous gas. The deodorized sprayed water falls back into the body of water, and the air with malodorous gas is removed from the tank. Preferably, the water is circulated through the spray at a rate greater than the rate at which the geothermal well water enters the tank. This ensures that mineral water collected in the tank is free of any objectionable odor.

Preferably, the water passes through a filter before it is sprayed, and the air entering the tank is heated to a temperature above at the temperature of the water to minimize cooling of the sprayed water, and also promote evolution of gas from the sprayed water. The deodorized mineral water in the tank is preferably heated to the required supply temperature, usually about 107° F., filtered, and then piped to private baths in individual rooms of a hotel or inn.

Preferably, the air passed through the sprayed water is thereafter passed through a biofilter or other suitable medium of microorganisms to remove malodorous gas from the air. In one preferred form, the air is dispersed into the soil of a flower bed where microbes in the soil decompose the hydrogen sulphide into a useful nutrient for plants.

In a further preferred form of the invention, the filter for the water is backwashed with water from time to time, and the materials removed from the filter with the wash water are used as a plant fertilizer.

These and other aspects of the invention will be more fully understood from the following detailed description and the accompanying drawings in which.

Figure 1:
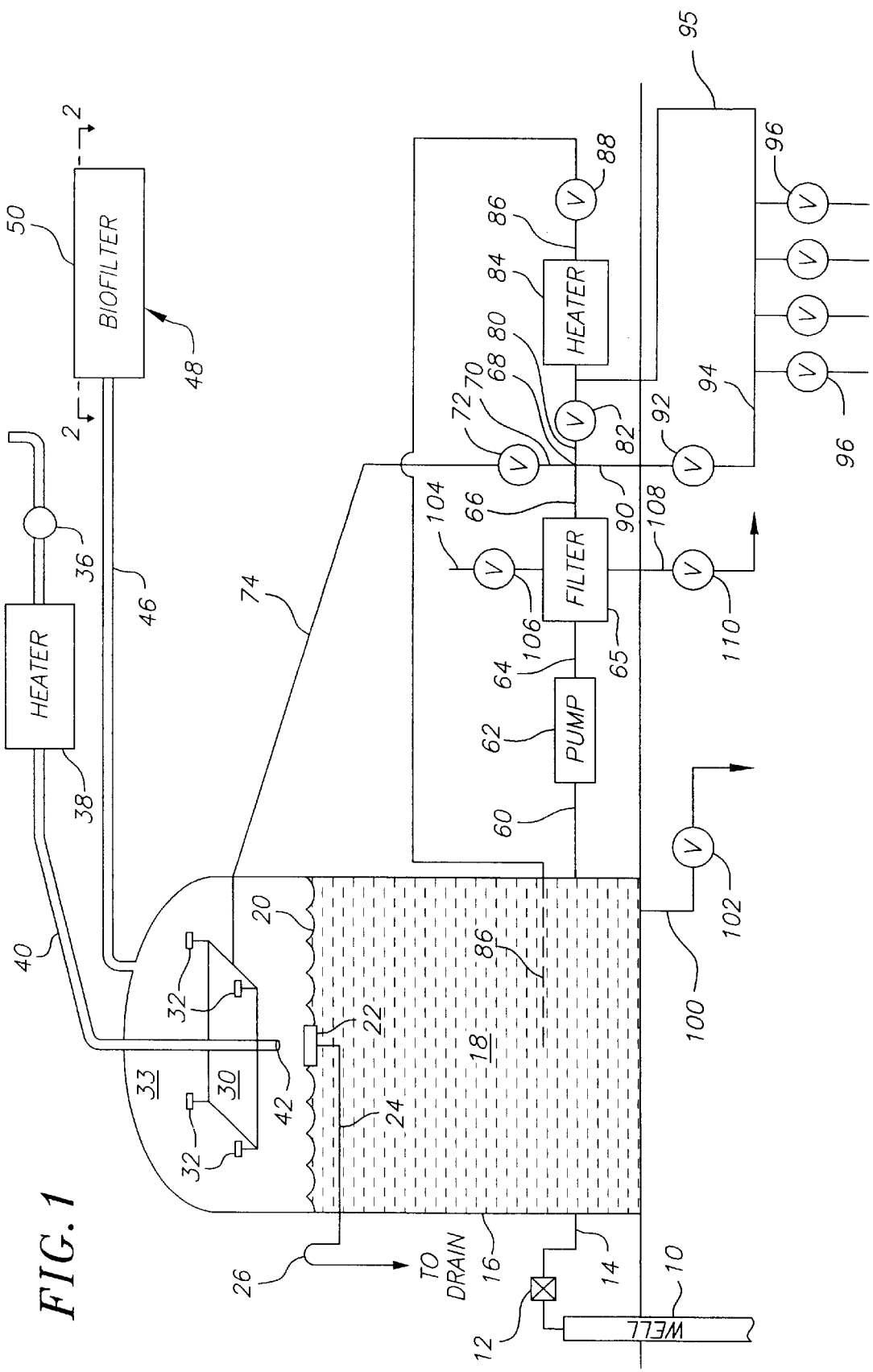
FIG. 1 is a schematic drawing of an apparatus used at the Paso Robles Inn to remove malodorous gas from geothermal well water in accordance with this invention.

Referring to FIG. 1, raw mineral water flows from a geothermal well 10 through a flow regulating valve 12, an inlet line 14, and into a storage tank 16, which holds a body 18 of water at a maximum operating level 20 established by an overflow drain 22 mounted at a fixed height above the tank bottom. An overflow line 24 carries excess water from drain 22 through an inverted gooseneck 26 exterior of the tank and to a sewer line (not shown), so that water in the tank never exceeds the maximum operating level 20. The inverted gooseneck keeps the air from escaping at the drain 22.

Water flowing from geothermal sources can have a wide concentration of hydrogen sulphide and other noisome gases. By way of example, the raw mineral water flowing from the geothermal well at the Paso Robles Inn in Paso Robles, Calif. has about 30 ppm of dissolved hydrogen sulphide as it flows from the well at a temperature of about 100° Fahrenheit. After the body of water in the storage tank is treated as described below, the amount of hydrogen sulphide in the stored mineral water is less than 0.2 ppm.

Raw water flows from the geothermal well under natural artesian pressure through the flow regulating valve into the tank, which can be of any suitable size, say, sufficient to hold about 5,000 gallons of water when at the maximum operating level. The tank is sufficiently large so that it serves as a reservoir for the treated water, and so the flow rate from the well can be set at a relatively low, constant value (say, between about 1 and about 5 gallons per minute), even though use of the treated water from the tank can sometimes be as high as 40 gallons per minute or more. In short, the tank is sized and matched to the incoming and outgoing flow rates so that, when full (at the maximum operating level), the tank holds about twice the average daily hotel demand.

A horizontal square spray manifold 30 is mounted in the center of the upper part of the tank above the maximum level of water stored in the tank. A separate sprinkler head 32 at each corner of the spray manifold directs an umbrella-shaped spray (not shown) up into the open head space 33 in the top part of the tank so that the spray patterns from the sprinkler heads overlap. More than four sprinklers can be mounted on the manifold if increased aeration is required for the water being treated. A blower 36 forces outside air through a heater 38 and an air inlet duct 40, which passes down through the top of the tank and down through the center of the spray manifold. The lower end 42 of the air inlet is open, and discharges fresh air into the tank directly over the drain and under the umbrella-shaped spray pattern from the sprinkler heads. The drain is stair-stepped so that water discharged to the overflow has maximum contact with inlet air. The heated incoming air spreads radially and upwardly through the water sprayed from the sprinklers. The air oxidizes some of the hydrogen sulfide gas released from the sprayed water. The rest of the hydrogen sulfide leaves with air through an air outlet duct at the upper end of the tank 46 and passes into a biofilter 48, which can be of any conventional type. I prefer to use a flower bed 50 (see FIGS. 2 and 3), which includes a bed 52 of soil containing naturally occurring microorganisms which decompose hydrogen sulphide into nutrient for plants (not shown) in the flower bed.

Figure 2:
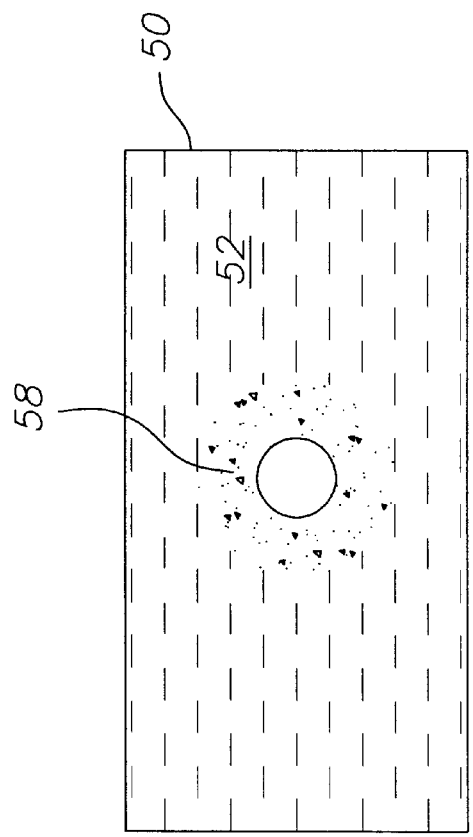
FIG. 2 is a view of a biofilter taken on line 2—2 of FIG. 1.
Figure 3:
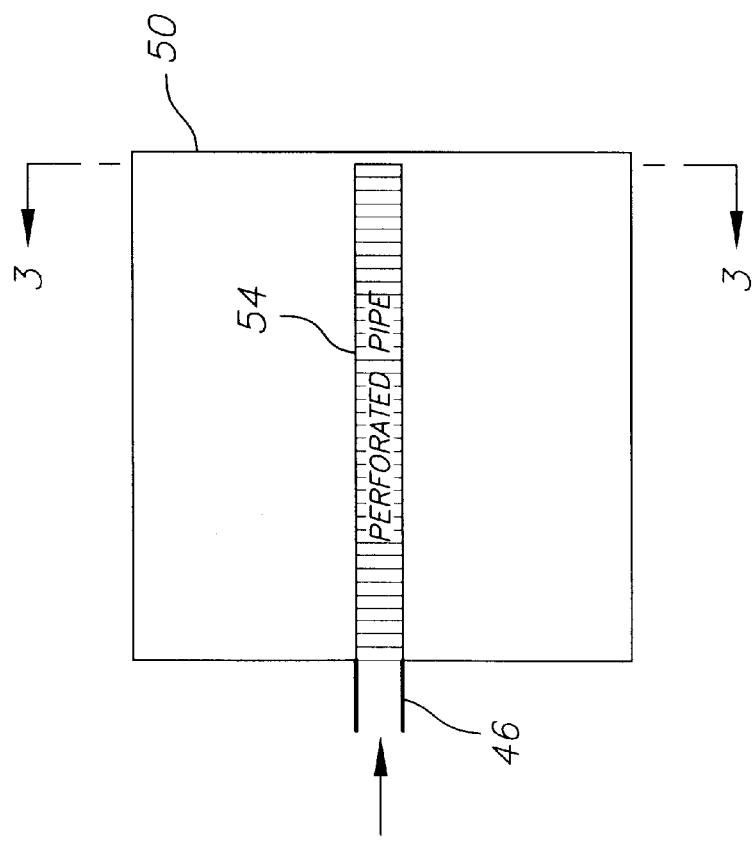
FIG. 3 is a view taken on line 3—3 of FIG. 2.

As shown in FIG. 2, the discharge end of the air outlet duct 46 is connected to a horizontal perforated pipe 54 buried in the soil, and which extends through the flower bed. An annular layer 58 of gravel surrounds the perforated pipe. The naturally occurring microorganisms in the soil in the flower bed decompose the hydrogen sulphide into plant nutrient so efficiently that there is no detectable hydrogen sulfide smell discharging from the surface of the biofilter. Thus, no significant amount of hydrogen sulphide is discharged to the atmosphere. The flower bed removes hydrogen sulfide from the air so efficiently that the bed can be relatively small. For example, a square bed of soil only two feet deep and four feet long on each side is adequate for the deodorizing unit used at the Paso Robles Inn.

The air supplied to the tank can be heated to any suitable temperature, preferably above the desired water temperature, and usually between about 100° and about 190° F. Heating the air reduces the temperature drop of the sprayed water and promotes the escape of hydrogen sulphide gas from the sprayed water. Air flows throughout the tank headspace at a rate sufficient to remove unreacted malodorous gas evolved from the mineral water. For normal operation at the Paso Robles Inn, using a 4" plastic pipe for the air inlet and outlet ducts, and operating the blower to provide a pressure of about 1" of water (about 0.04 psi) at the tank inlet produces satisfactory air flow through the water spray in the tank, and through the flower bed.

Referring to FIG. 1, an outlet line 60 in a lower portion of the tank supplies deodorized mineral water from the tank to the inlet of a pump 62, which pumps the water from the tank through a line 64 into a filter 65 to remove solid particles present in the water because of reaction taking place within the tank. A filter discharge line 66 supplies filtered mineral water to a first leg 67 of a 4-legged cross plumbing fixture 68. A second leg 70 of the cross is connected through a first valve 72 to a spray supply line 74, which delivers filtered water under pressure to the spray manifold and sprinkler heads in the tank. A third leg 80 of the cross supplies filtered mineral water through a second valve 82 to a heater 84, which may be of conventional type, and which heats the water to about 107° F. Filtered and heated water flows through a return line 86 and a control valve 88 to a bottom portion of the body of water in the tank and away from the pump inlet. The water flows into the tank through return line 86 disposed to inject water into the tank at an angle of about 45° to the tank wall to promote circulation in the tank.

A fourth leg 90 of the cross-fixture circulates warm filtered mineral water through a valve 92, a supply manifold line 94, and back to the heater inlet through a return line 95. A series of outlet valves 96 connected to the manifold line each control the flow of filtered, heated, and deodorized mineral water to a spa or bath in a respective individual room (not shown)of a hotel, inn, or the like.

The tank is drained for cleaning, maintenance, or repair through a drain line 100 in the bottom of the tank. A normally closed drain valve 102 is in the drain line.

From time to time, the filter for the water becomes loaded with solid particles, and is backwashed with tank water supplied through an inlet line 104 and control valve 106. The wash water and removed solids flow from the filter through a discharge line 108 and outlet valve 110 to a collector (not shown) so the water and solids in it can be used to fertilize plants.

In operating the equipment just described, the mineral water stored in the tank is circulated through the sprinkler heads at a rate greater than the flow rate of water from the well. The sprayed water is circulated at a rate greater than that of the flow rate from the well, and preferably up to twenty times the well flow rate to ensure removal of substantially all the hydrogen sulphide and any other noisome volatiles dissolved in the well water. For example, if raw mineral water flows from the well into the tank at a flow rate of about 1.5 gallons per minute, circulation of the water in the tank through the sprinkler heads at the rate of about 10 gallons per minute produces deodorized mineral water. By operating the system in this way, the raw well water, which contains about 30 ppm of hydrogen sulphide, is treated so that the mineral water collected in the tank contains less than 0.2 ppm hydrogen sulphide. Moreover, by circulating filtered water from the body of water in the tank through the spray manifold, the sprinkler heads handle mineral water with only a small amount of malodorous gas, and with a low solids content. This minimizes plugging of the sprinkler heads, and provides long periods of trouble-free operation to supply deodorized mineral water at a comfortable temperature for hygienic use in baths or spas located in individual rooms of a hotel or inn.

I claim:

1. Apparatus for treating geothermal water to remove a malodorous gas, the apparatus comprising:

a tank for holding a body of treated geothermal water;

a tank inlet for geothermal water with a dissolved malodorous gas, a sprinkler system in the tank for spraying geothermal water in the tank to create a spray of geothermal water above the body of water in the tank;

a tank inlet for admitting air into the tank;

a tank outlet for removing air from the tank, the air inlet and air outlet being located with respect to each other so air flows through the spray of geothermal water and removes malodorous gas from the geothermal water;

a medium of microorganisms which remove malodorous gas from air connected to the air outlet; and a tank outlet for removing treated geothermal mineral water from the tank.

2. Apparatus according to claim 1 which includes a heater for heating water in the tank.

3. Apparatus according to claim 1 or 2 which includes a heater for heating air flowing through the air inlet.

4. Apparatus according to claim 1 or 2 which includes a pump for circulating water through the tank.

5. Apparatus according to claim 4 which includes a filter for filtering water in the tank.

6. Apparatus according to claim 1 or 2 which includes an overflow drain in the upper portion of the tank for establishing a maximum operating liquid level within the tank.

7. Apparatus according to claim 1 or 2 in which the tank inlet is in a lower part of the tank.

\* \* \* \* \*